June 24, 1924.
P. G. MAY ET AL
1,499,115
REVERSE CONTROL GEAR
Filed July 25, 1923
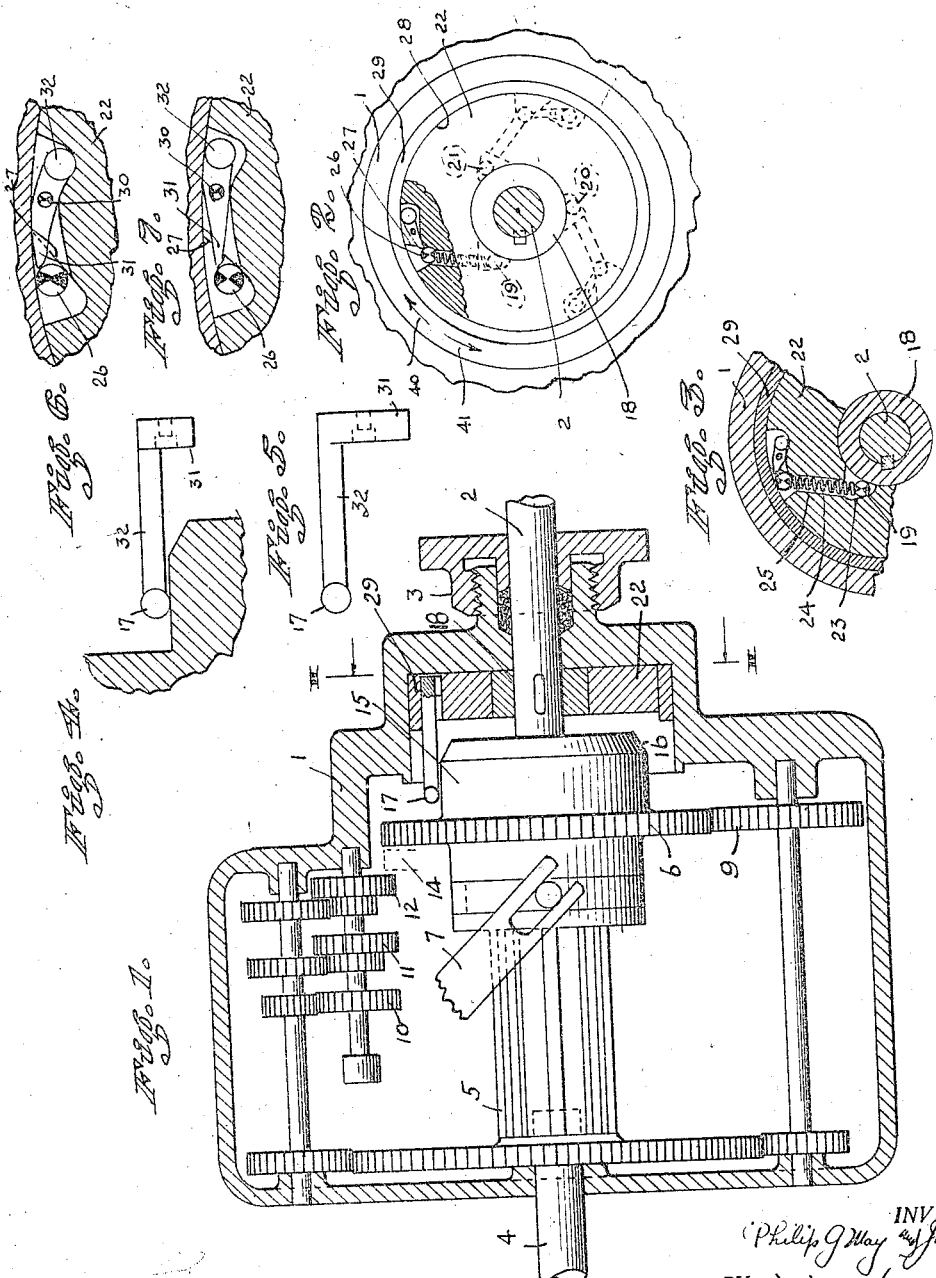
INVENTOR.
Philip G. May
BY
ATTORNEYS.

Patented June 24, 1924.

1,499,115

UNITED STATES PATENT OFFICE.

PHILIP G. MAY AND JUVENAL GRIGNOLO, OF SAN FRANCISCO, CALIFORNIA.

REVERSE-CONTROL GEAR.

Application filed July 25, 1923. Serial No. 653,644.

*To all whom it may concern:*

Be it known that we, PHILIP G. MAY and JUVENAL GRIGNOLO, citizens of the United States, and residents of the city and county of San Francisco, State of California, have invented new and useful Improvements in Reverse-Control Gears, of which the following is a specification.

Our invention is particularly adapted to motor driven vehicles and has for its object means and mechanism to prevent the vehicle from moving in a backward direction except when the mechanism is operated especially with this intent.
A further object is the provision of mechanism in combination with the driving connections of a motor vehicle to prevent the vehicle moving backwards at times when the gear mechanism is set in what is known as the neutral position.

A further object is means and mechanism to lock a motor vehicle against backward movement.

Other objects will appear from the drawings and specifications which follow.

Referring to the accompanying sheet of drawings.

Fig. 1 represents our invention applied to a conventional gear drive, showing some of the parts in section and some in view for the purpose of making clear the operation.

Fig. 2 is a front view with a portion of the driving gear broken away to show the relation of the parts.
Fig. 3 is an enlarged view of the rollers and the actuating tumblers holding them out of engagement with the associated mechanism.

Fig. 4 is an end view of one of the tumblers.

Fig. 5 is a plan view of Fig. 4.

Fig. 6 is a front view of part of Fig. 2 with one of the rollers and tumblers shown in its locking position.
Fig. 7 is similar to Fig. 6 except that the roller and tumbler are here shown in disengaged position.

Throughout the figures similar numerals refer to identical parts.
The stationary portion of the gear or transmission case of any well known motor vehicle of conventional type is shown by the numeral 1 through which the driven shaft 2 extends surrounded by the packing gland 3, on the end of which shaft is provided the splined portion 5, and on which the loose gear 6 is adapted to freely slide as by the action of the arm 7. The driving shaft is shown at 4. The gear 6 may mesh as shown with the reverse gear 9 or with either of the forward driving gears 10 or 11 or 12 in the several ranges of different forward driving speeds. It may also occupy the inert position 14 or it may occupy neutral positions between the gears 10 or 11 or between 11 and 12.

The gear 6 is provided with a hub 13 having a conical edge 16 on which the arms 17 of a plurality of tumblers may enter when the gear 6 is advanced to the right on the spline 5, or leave the cylindrical surface 15 when the gear is moved to the left as by the fork 7. At 18 is a hardened steel collar keyed to the shaft 2 and against the outer surface of which the cylindrical rollers or balls are seated in pockets, the said pockets having a sloping surface as 23, whereby the roller is freed from contact with the collar 18 when at one end of the pocket or wedges against the said surface 23 at the other end of the pocket.

A spring 24 passing through a hole 25 bears against the roller 19 on one end and at the opposite end bears against the similar roller 26, which latter roller seats against the inclined surface 27 in a similar pocket of reverse form in the outer periphery of the member 22. The two rollers 19 and 26 are therefore normally pressed apart by the spring 24. The roller 19 at such times wedging between the collar 18 and the surface 23 and the roller 26 wedging between the surface 27 and the periphery 28 of the adjacent member 29, which is preferably also a hardened collar fixed in a stationary element 1. At 30 is pivoted a tumbler having a pawl end 31 on one side of the pivot and an extending arm 17 from its other end 32 on the other side of the pivot, whereby the tumbler may freely move upon its pivot 30 to depress the ball 26 away from the surface 28 as shown in Figs. 2 and 7, or when released as shown in Figs. 3 and 6, allow the roller 26 to wedge between the surfaces 27 and 28.

While we have specifically described the pair of rollers 19 and 26 and their associated mechanism and action, it will be understood that there are a plurality of these pairs of rollers and associated mechanism spaced about the axis of the shaft 2, whereby the side strains about the axis of the shaft 2 are opposed to each other and therefore prevent distortion under pressure.

It will now be seen that when the gear 6 occupies the full line position of Fig. 1 the ends 17 of the arms 32 will have been forced outward by the cone 16 and will thereafter ride upon the cylindrical surface 15 and this movement will cause the pawls 31 to force the rollers 26 out of wedging contact with the surface 28 as shown in Fig. 3 and at such times the gear 6 through the spline sleeve 5 will drive the shaft 2 freely in the direction of the arrow 40, this being the reverse direction or corresponding with the backward movement of the vehicle. If now the arm 7 be manipulated to shift the gear 6 to the position shown in Fig. 1 the first movement upon its engagement of the reversing gear 9, will be the position that in which the pawls 31 will still be retaining the rollers 26 out of engagement with the surface 28 and the automobile may be freely driven backwards.

By shifting the gear 6 to the position 14 it is disconnected from the reverse gear 9 but the arms 17 still ride on the surface 15 and the rollers are still held in the position of Figs. 2 and 7, i. e., out of engagement and the vehicle may be freely moved about as on the garage floor, being what is known as out of gear.

The pivot is shown in dotted lines in Figs. 4 and 5. The pawl and its arm 32 and end 17 being preferably made of a single drop forging.

A further movement to the left of the gear 6 results in the ends 17 riding down the cone 16 and the pawls 31 being forced from the position of Fig. 7 to that shown in Fig. 6. The spring 25 at such time forces the roller 26 into wedging engagement between the surface 27, 28, and the shaft 2 may no longer be rotated in the direction of the arrow 40, because it will be held by the wedging action of the rollers as 19 and 28, against such movement by the rigid member 29. It will, however, be free to move in the opposite or forward vehicle direction as shown by the arrow 41. It will therefore be seen that in shifting of the gear 6 beyond the position 14 to the left when the gear 6 is in mesh with either of these gears 10 and 11 or 12, and also during the several intermediate or neutral positions between the gears 10 and 11, into any of the forward driving positions.

The driving shaft 4 may freely move in the forward direction of arrow 41 of Fig. 2 during these various positions of the gear 6, but at all times will be restrained against any rearward movement in the direction of the arrow 40.

It will therefore be seen that at no time can the vehicle be moved backward except when the operator has intentionally set the gear shift connection 7 in an intentional predetermined position for that specific purpose and that the vehicle is locked against backward movement at all times when the gear shift 7 is in any of its neutral positions.

Reference is herein made to my copending application, Serial No. 703,555 filed April 1st, 1924.

We claim:

1. In clutch mechanism, a shaft and a stationary element surrounding the shaft, a collar interposed between the shaft and the element, a plurality of rollers in sloping walled pockets interposed between the shaft and the collar and other rollers and sloping walled pockets interposed between the collar and the element, whereby the shaft is free to rotate within the collar and the collar is free to rotate within the element in one direction and each is locked against rotation in the opposite direction, and means for displacing the rollers on the sloping walls to release the said locking engagement.

2. Clutch mechanism including the combination set forth in claim 1 wherein the means for displacing the rollers includes levers pivoted to the collar and having an exposed end, and a cylindrical member slidable on said shaft adapted to engage or disengage the said ends.

3. In combination with motor vehicle gear driving mechanism, a shaft and a gear thereon adapted to be shifted to engage any one of a plurality of forward driving gears and also having a range of movement beyond said engaging movement, clutch means permitting the shaft to freely advance and having rollers adapted to clutch said shaft against any reverse movement, and means actuated by the first named gear when shifted within said range to hold said rollers out of clutch engagement.

PHILIP G. MAY.
JUVENAL GRIGNOLO.